(12) United States Patent
Fenwick et al.

(10) Patent No.: US 6,256,694 B1
(45) Date of Patent: *Jul. 3, 2001

(54) DISTRIBUTED EARLY ARBITRATION

(75) Inventors: David M. Fenwick, Nashua, NH (US); Denis Foley; Stephen R. Van Doren, both of Shrewsbury, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/269,251

(22) Filed: Jun. 30, 1994

(51) Int. Cl.$^7$ .......................... G06F 13/36; G06F 13/368
(52) U.S. Cl. .................. 710/107; 710/118; 710/125; 711/117
(58) Field of Search ................ 395/200.01, 824, 395/840, 860, 287, 291, 292, 293, 296, 306, 421.01, 728, 729, 732; 711/124, 117, 135, 118; 710/125, 119, 113, 118, 107

(56) References Cited

U.S. PATENT DOCUMENTS

| | | | |
|---|---|---|---|
| 3,896,419 | * | 7/1975 | Lange et al. .......................... 711/129 |
| 3,979,726 | * | 9/1976 | Lange et al. .......................... 711/135 |
| 4,181,938 | * | 1/1980 | Suzuki et al. .......................... 710/23 |
| 4,257,095 | * | 3/1981 | Nadir ................... 364/200 |
| 4,620,278 | * | 10/1986 | Ellsworth et al. .................. 710/119 |
| 4,703,420 | * | 10/1987 | Irwin ................... 395/800 |
| 4,908,749 | * | 3/1990 | Marshall et al. ...................... 395/294 |
| 4,953,078 | * | 8/1990 | Petit ................... 712/248 |
| 4,980,854 | * | 12/1990 | Donaldson et al. ................. 710/117 |
| 5,067,071 | * | 11/1991 | Schanin et al. ........................ 710/113 |
| 5,113,522 | * | 5/1992 | Dinwiddie, Jr. et al. ........... 709/400 |
| 5,168,568 | * | 12/1992 | Thayer et al. ........................ 710/125 |
| 5,195,185 | * | 3/1993 | Marenin ................. 710/123 |
| 5,297,292 | * | 3/1994 | Morimoto et al. .................. 395/293 |
| 5,301,283 | * | 4/1994 | Thacker et al. ...................... 710/116 |
| 5,325,508 | * | 6/1994 | Parks et al. .......................... 711/118 |
| 5,345,576 | * | 9/1994 | Lee et al. ............................. 710/138 |
| 5,412,788 | * | 5/1995 | Collins et al. ....................... 711/157 |
| 5,416,910 | * | 5/1995 | Moyer et al. ........................ 395/293 |
| 5,455,912 | * | 10/1995 | Ludwig ................. 395/293 |
| 5,459,840 | * | 10/1995 | Isfeld et al. .......................... 395/309 |
| 5,758,106 | * | 5/1998 | Fenwick et al. ..................... 710/125 |

FOREIGN PATENT DOCUMENTS

| | | |
|---|---|---|
| 0 468 786 | 1/1992 | (EP) . |
| 0 514 080 | 11/1992 | (EP) . |
| 0 597 790 | 5/1994 | (EP) . |

OTHER PUBLICATIONS

IBM Technical Disclosure Bulletin, vol. 37, No. 5, May 1994, pp. 37–38.

* cited by examiner

*Primary Examiner*—Larry D. Donaghue
(74) *Attorney, Agent, or Firm*—Cesari & McKenna, LLP (57) ABSTRACT

A commander module, coupled to a system bus including system bus control request signals and associated with one of the system bus control request signals, including means for determining whether control of the system bus is required and means for requesting control of the system bus, prior to determining whether such control is required, by asserting the associated system bus control request signal. A computer system including the system bus and at least two such commander modules coupled to the system bus and means for arbitrating for control of the system bus where the arbitrating means are coupled to and responsive to the system bus control request signals.

13 Claims, 6 Drawing Sheets

DISTRIBUTED EARLY ARBITRATION

BACKGROUND OF THE INVENTION

This invention relates generally to computer systems, and more particularly to the arbitration mechanism for accessing a system bus of a computer system.

As it is known in the art, computer systems generally include at least one central processing unit (CPU) module, a main memory for storing data, at least one input/output (I/O) module, and a system bus coupling the aforementioned devices to the CPU module. The system bus typically includes data, address, and control lines. The CPU module often includes a processor for executing instructions and a cache memory for storing data and instructions which are readily accessible to the processor. The I/O module may be used to connect the computer system to many different types of devices, including other computer systems or secondary memory. Secondary memory is generally large and may include magnetic tape drives, disk drives, etc.

Often, the main memory includes a plurality of independent memory modules each having an interface to the system bus. The CPU can generally access cache memory more quickly than main memory and main memory more quickly than secondary memory. Each memory module contains semiconductor chips having a predetermined number of memory cells. The chips are often referred to as RAM, Random Access Memory, or DRAM, Dynamic Random Access Memory, in that each storage location is randomly addressable, as distinguished from other types of memory devices such as magnetic tape or disk which are sequentially accessible, in that a number of storage locations are scanned before reaching the desired addressed location.

Generally each memory module and I/O module responds to a different address range within the overall address range of the computer system. The size of each I/O module's address range depends on the size of the secondary memory to which it is connected and the mechanism used to convert system bus addresses into secondary memory addresses. The size of each memory module's address range corresponds to the number of addressable locations on the module. The starting address of a module's address range may be determined by virtue of the position (i.e., backplane slot) in which the module is placed within the computer system, or the starting address may be assigned through the use of memory configuration software and hardware which determines the number of addressable locations of each memory module in the system prior to assigning address ranges.

CPUs, as well as other commander modules such as the I/O interface, are capable of initiating transactions (read, write, etc.) on the system bus. Upon power-up, the CPU's cache memory is initialized and ready to be loaded with data from main memory or secondary memory. The CPU's processor loads the cache memory with needed instructions and data both at power-up and during processing as new data and instructions are needed. During processing the needed data may be in another CPU's cache memory or in main or secondary memory, also, data may be required to be written back into memory, main or secondary, prior to reading new data into cache memory. In any case, the CPU needs to gain control of the system bus in order to initiate a transaction on the system bus to access the data or instructions.

In order to initiate a transaction on the system bus, a CPU first gains control of the system bus which is often accomplished by arbitrating for the bus. There are typically two types of arbitration schemes; central arbitration and distributed arbitration. In a distributed arbitration scheme, all commander modules (i.e., modules capable of requesting control of the system bus) independently monitor all system bus control request signals to determine whether a transaction has been requested, and if so, which commander module is to be granted control of the system bus. In a central arbitration scheme, a central arbiter receives each commander module's request for system bus control (i.e., each commander module does not receive the other commander modules' request signals) and grants control of the system bus to one of the commander modules who requested such control.

Because CPU processors do not attempt to gain control of the system bus until they determine that they need to initiate a transaction on the system bus, the time required for arbitration is directly added to the time required to complete a transaction. Where the transaction is a read or write to memory, the memory latency includes the time required for arbitration.

SUMMARY OF THE INVENTION

In accordance with the present invention, a commander module is coupled to a system bus including system bus control request signals, and the commander module is associated with one of the system bus control request signals. The commander module includes means for determining whether control of the system bus is required and means for requesting control of the system bus, prior to determining whether such control is required, by asserting the associated system bus control request signal. With such an arrangement, the time to complete a transaction on the system bus may be reduced.

In accordance with another aspect of the present invention, a computer system includes a system bus having system bus control request signals. Coupled to the system bus are at least two commander modules each associated with one of the system bus control request signals and including means for determining whether control of the system bus is required and means for requesting control of the system bus by asserting the associated system bus control request signal. Further, each commander module is capable of requesting control of the system bus prior to determining whether such control is required. The apparatus also includes means for arbitrating for control of the system bus where the arbitrating means are coupled to and responsive to the system bus control request signals and where the arbitrating means include means for granting control of the system bus to one of the commander modules. With such an arrangement, the time to complete a system bus transaction may be reduced.

In accordance with another further aspect of the invention, the arbitration means further includes means for withdrawing a commander module's request for control of the system bus when the commander module determines, during a non-arbitration cycle, that control of the system bus is not required and means for forcing a no-operation command on system bus command signals if the commander module is granted control of the system bus by the arbitration means after the commander module determines that control of the system bus is not required.

DETAILED DESCRIPTION OF A PREFERRED EMBODIMENT

As noted above, this invention involves an arbitration mechanism for gaining control of a system bus of a computer system in order to initiate a transaction on the system bus.

Figure 1:
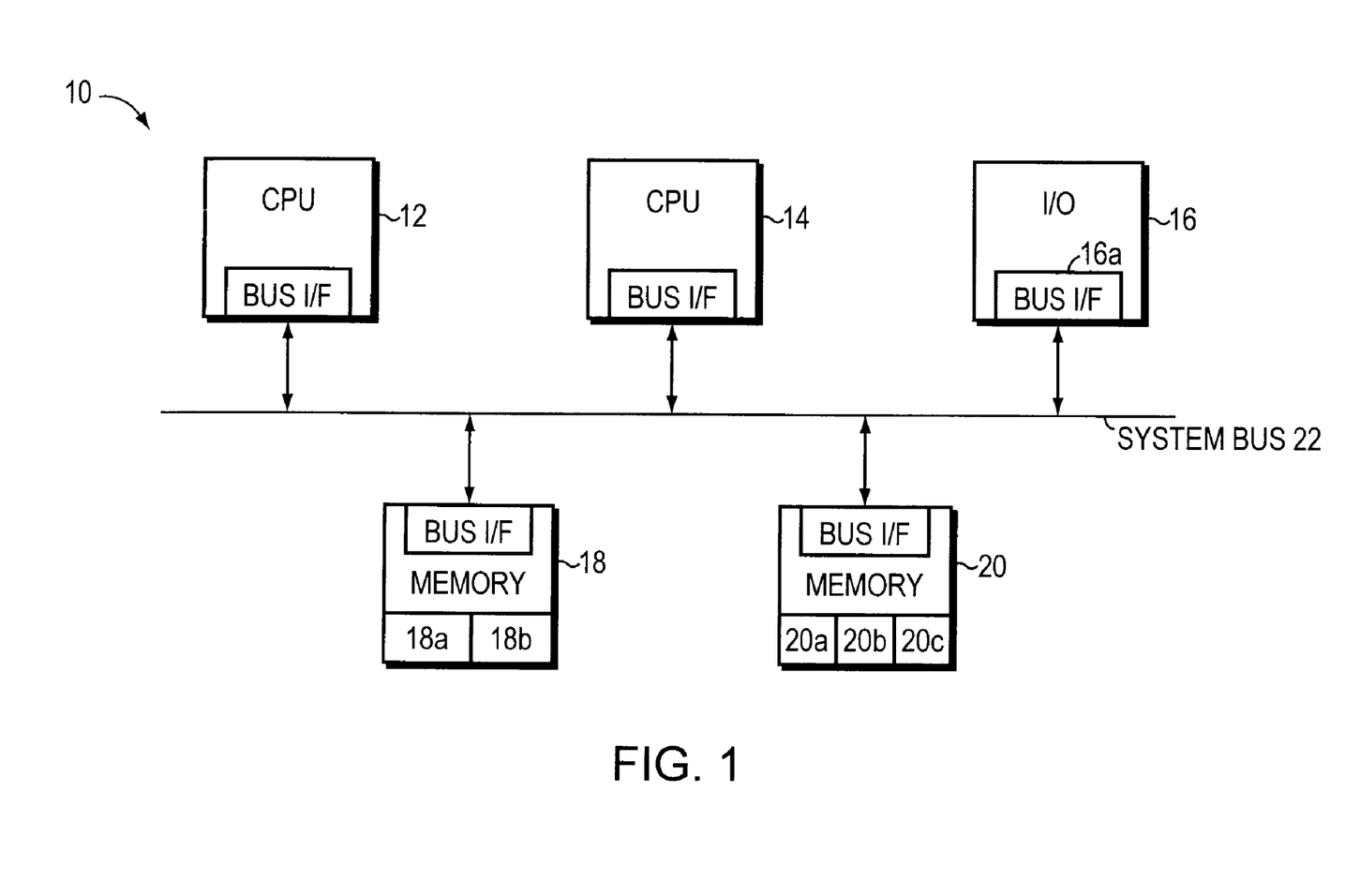
FIG. 1 is a block diagram of a computer system having a plurality of Central Processing Unit (i.e., CPU) modules, an Input/Output (i.e., I/O) module, and a plurality of memory modules connected together by a system bus.

Referring now to FIG. 1, a computer system 10 is shown to include a plurality of central processing unit (CPU) modules 12, 14, an input output (I/O) module 16, and a plurality of memory modules 18, 20 coupled together by a pipelined system bus 22. For simplicity, only two CPUs, one I/O, and two memory modules are shown, however, it should be understood that computer system 10 could have more of each module. There may also be other modules (not shown) connected to the system bus.

As also shown in FIG. 1, each memory module 18, 20 has multiple, independent memory banks, 18a and 18b for module 18 and 20a, 20b, and 20c for module 20. The number of memory banks per module is by way of example and it should be understood that in a preferred embodiment each memory module could have more or less memory banks or each memory module could have an equal number of memory banks. The addressing of main memory in a preferred embodiment allows for a flexible number of banks per memory module.

Figure 2:
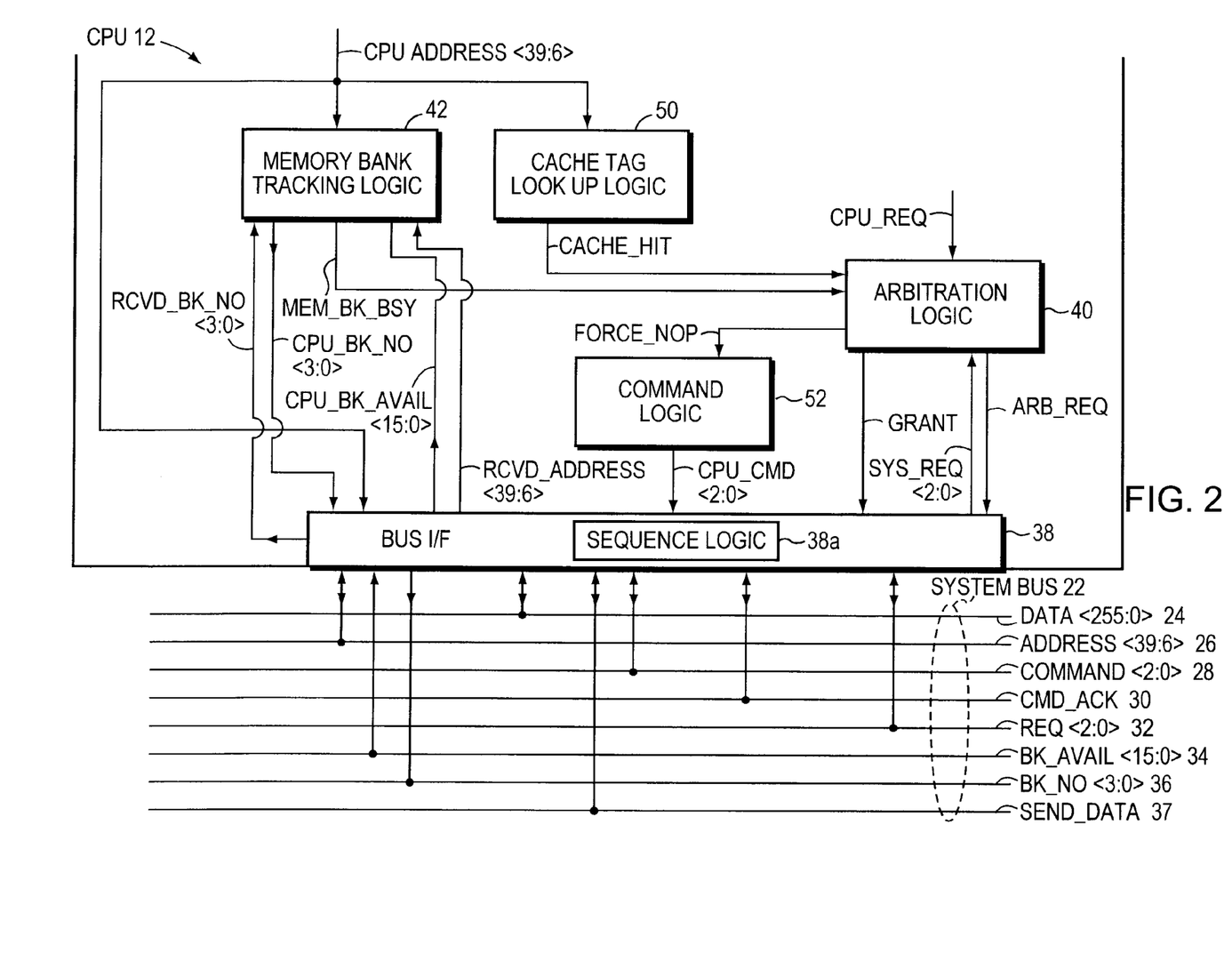
FIG. 2 is a more detailed block diagram of a portion of one of the plurality of CPU modules and the system bus of FIG. 1.

Referring now to FIG. 2, system bus 22 is shown connected to a portion of CPU 12. In a preferred embodiment, the system bus 22 includes a pipelined data bus and a pipelined address bus. It will be understood by one of skill in the art that the system bus could include a combination address/data bus. As will be described below, having separate pipelined address and data busses may prevent a reduction in the data transfer rate of the data bus when no-operation commands (i.e., commands to which no module will respond) are issued on the address bus. The data bus includes data signals 24, DATA <255:0> and a send data signal 37, SEND_DATA. The address bus includes address signals 26, ADDRESS <39:6>, command signals 28, Command <2:0>, a command acknowledge signal 30, CMD_ACK, system bus control request signals 32, REQ <2:0>, memory bank available signals 34, BK_AVAIL <15:0>, and bank number signals 36, BR_NO <3:0>.

Pipelining is a technique of decomposing a sequential process into subprocesses with each subprocess being executed in a special dedicated segment that operates concurrently with all other segments. A pipeline can be visualized as a collection of processing segments through which binary information flows. Each segment performs partial processing dictated by the way the task is partitioned. The result obtained from the computation in each segment is transferred to the next segment in the pipeline. The final result is obtained after the data has passed through all segments. It is characteristic of pipelines that several computations can be in progress in distinct segments at the same time.

Figure 3:
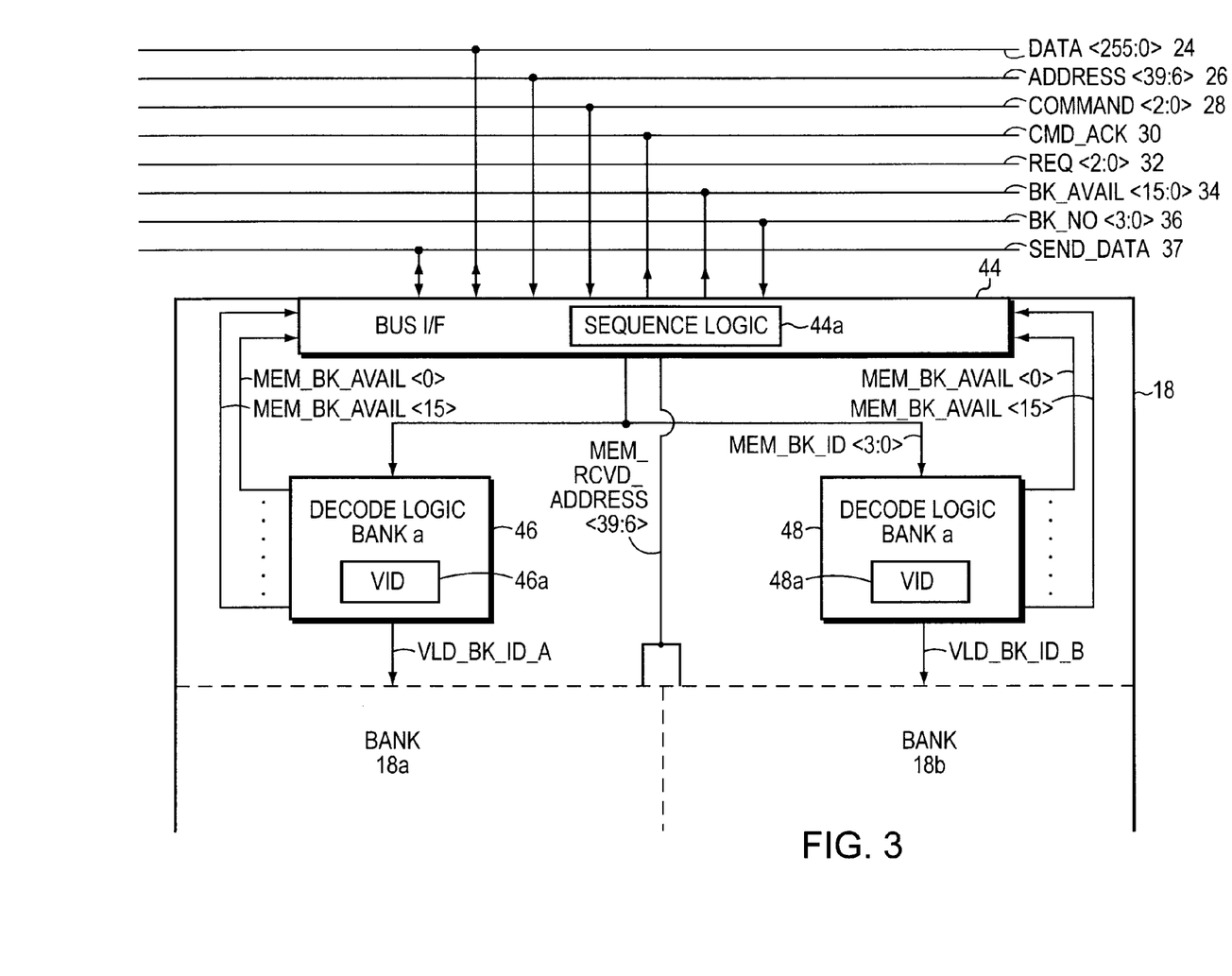
FIG. 3 is a more detailed block diagram of a portion of one of the plurality of memory modules and the system bus of FIG. 1.

In a preferred embodiment, a plurality of commander modules, 12, 14, 16 (FIG. 1) are capable of issuing transactions on the pipelined system bus 22. Once a commander module gains control of the system bus through arbitration, it drives an address on ADDRESS <39:6> 26, a bank number on BK_NO <3:0> 36, and a command on COMMAND <2:0> of system bus 22. Two cycles later, the target (i.e., the module which corresponds to the address or bank number) of the transaction asserts the command acknowledge signal, CMD_ACK, to indicate that it will respond to the transaction. It will be understood by one of skill in the art that the timing of the system bus signals is by way of example. Further, because it is a pipelined bus used by a plurality of commander modules, the data bus returns data in the same order as the address and commands issued on the address bus. To permit this, each valid command (i.e., all commands except a no-operation command) is tagged by the commander modules and target modules with a sequence number. As shown in FIG. 2, CPU 12 includes sequence logic 38a, and as shown in FIG. 3, memory module 18 includes sequence logic 44a.

In a preferred embodiment, a maximum of sixteen outstanding transactions are allowed on the system bus at any one time. This requires a wrapping four bit count which will be referred to as the sequence number. All commander modules have a four bit sequence number counter (not shown) corresponding to the next outstanding transaction to be completed on the data bus. When a target module asserts SEND_DATA indicating that an outstanding transaction is to be completed, the commander modules increment their sequence number counters to correspond to the next outstanding transaction to be completed on the data bus. Target modules also have four bit sequence number counters (not shown) which are incremented each time a target module asserts CND_ACK indicating that the command issued on the address bus is a valid command to be completed. Thus, when a command is a no-operation command due to false arbitration, to be described in detail later, the sequence number is not incremented. An addressed target module stores the sequence number corresponding to the issued command, and when the previous sequence number driven on the data bus sequence number lines indicates that the stored sequence number represents the next outstanding transaction to be completed on the data bus and when the target is ready to respond, the target asserts SEND_DATA, drives the stored sequence number on the sequence number lines and completes the transaction.

By way of example, the computer system will be described as supporting one Terabyte of main memory and sixty-four byte block data transfers (i.e., sixty-four byte blocks of data are transferred with each system bus transaction directed at main memory where eight bits equals a byte and five hundred and twelve bits equals a sixty-four byte block). Thus, each addressable memory location will store sixty-four bytes of data, and in order to address sixty-four byte blocks of data, the least significant address bit needed is bit six. Therefore, the address signal lines 26 are denoted as ADDRESS <39:6>. Each transaction will involve two data cycles where each cycle transfers two hundred and fifty-six bits of data. Hence, the data signal lines 24 are denoted as DATA <255:0>.

Also by way of example, the present system will be limited to a maximum of sixteen memory banks. Thus, sixteen memory bank available signals 34 are needed, BK_AVAIL <15:0>, and four bank number signals are needed, BK_NO <3:0> to uniquely identify each bank. These signals will be described in more detail below.

The following description will be with reference to CPU 12. However, it is to be understood that the description of CPU 12 applies to CPU 14, as well as other CPU modules (not shown) and other commander modules capable of initiating transactions directly with main memory, including I/O module 16 (FIG. 1).

CPU 12 is shown including system bus interface 38 and arbitration logic 40 which receives a request for system bus control signal, CPU_REQ, from one or more processors on CPU 12 (not shown) when a processor wants to gain control of the system bus to initiate a transaction. Upon the assertion of CPU_REQ, arbitration logic 40 asserts an arbitration request signal, ARB_REQ, to system bus interface 38 which asserts the system bus control request signal, REQ <2:0>, associated with CPU 12 on system bus 22. Arbitration logic 40 is also shown to receive each system bus control request signal, REQ <2:0>. During each arbitration cycle each system bus control request signal has a unique priority level, arbitration logic 40 determines which commander module wins arbitration by comparing the priority levels of the asserted system bus control request signals. Arbitration logic 40 provides a grant signal, GRANT, to system bus interface 38 and to the processor (not shown) if the CPU 12 wins arbitration.

It will be understood by one of skill in the art that each module capable of controlling the system bus (i.e., commander module) will have a system bus control request signal associated with it. Thus, by way of example, three system bus control request signals are shown, REQ <2:0>, because the computer system 10 of FIG. 1 shows two CPU modules and one I/O module (i.e., three commander modules).

The arbitration scheme depicted in FIG. 2 and implemented in a preferred embodiment is a distributed arbitration scheme. However, one of skill in the art will realize that a central arbitration scheme could be used with minor modifications to the logic shown. In general, distributed arbitration schemes determine which commander module will be granted control of the system bus more quickly than central arbitration schemes.

As also shown in FIG. 2, CPU 12 also includes tracking logic 42 which receives from one or more processors on CPU 12 (not shown) the address signals, CPU_ADDRESS <39:6>, to be driven onto system bus 22. The CPU system bus interface 38 sends tracking logic 42 the received system bus address bits, RCVD_ADDRESS <39:6>, and the received system bus memory bank available signals, CPU_BK_AVAIL <15:0>. With these signals, tracking logic 42 determines if the memory bank the processors (not shown) want to access is available (i.e., not busy with another transaction). If the memory bank the processor wants to access is unavailable (i.e., busy), tracking logic 42 asserts a memory bank busy signal, MEM_BK_BSY, to arbitration logic 40. The assertion of MEM_BK_BSY, as will be described in more detail below, causes arbitration logic 40 to withdraw its request for control of the system bus during a non-arbitration cycle when CPU 12 has not won arbitration or, if CPU 12 has won arbitration, forces the issuance of a no-operation command on the system bus command lines, Command <2:0>.

In an efficient computer system, only commander modules prepared to execute a transactions with memory banks which are available are allowed to gain control of the system bus. There are often times when a memory module will be inaccessible because it is busy with another task, such as a memory refresh. Additionally, a memory module may be unavailable for a period of time following a write transaction where the CPU has transferred the data and released the system bus, but the memory module is still involved with writing the data into the RAMs. To avoid sending transactions to a memory bank which is unavailable, a sophisticated computer system may require all commander modules to decode addresses sent on the system bus by all other modules to determine and track which memory banks are in use.

In determining whether the desired memory bank is available, tracking logic 42 decodes CPU_ADDRESS <39:6> to determine which memory bank 18a or 18b of module 18, 20a, 20b, or 20c of module 20, (FIG. 1) or another memory bank on another memory module (not shown) is the target of the intended transaction. It then compares the target bank to the received memory bank available signals, CPU_BK_AVAIL <15:0>. If the target bank's corresponding bank available signal is deasserted (i.e., the memory bank is busy), then tracking logic 42 asserts MEM_BK_BSY to arbitration logic 40.

To reduce the time required to address main memory, tracking logic 42, after determining which memory bank the processor (not shown) wants to access, drives a unique four bit value corresponding to the memory bank to be accessed on CPU_BK_NO <3:0> to bus interface logic 38. Bus interface logic 38 then drives BK_NO <3:0> with corresponding values. This allows the memory modules to determine if they are the target of the current system bus transaction by quickly comparing the value driven on BK_NO <3:0> to a value held in a register as opposed to having to decode the entire address.

In tracking unavailable memory banks, tracking logic 42 also compares CPU_ADDRESS <39:6> to RCVD_ADDRESS <39:6>, where RCVD_ADDRESS <39:6> reflects the value driven on the system bus ADDRESS <39:6> 26 signals in the current transaction, or tracking logic 42 compares CPU_BK_NO <3:0> to RCVD_BK_NO <3:0>, where RCVD_BK_NO <3:0> reflects the value driven on system bus BK_NO <3:0> signals in the current transaction. If the bits match, then the processor on CPU 12 is attempting to access an unavailable memory bank and tracking logic 42 asserts MEN_BK_BSY to arbitration logic 40.

If the memory banks are able to deassert their corresponding memory bank available signals, BK_AVAIL <15:0>, within sufficient time such that CPU_BK_AVAIL <15:0> reflects the most recent memory bank access when tracking logic 42 compares the target bank to CPU_BK_AVAIL <15:0>, then the compare of CPU-ADDRESS <39:6> to RCVD_ADDRESS <39:6> or CPU_BK_NO <3:0> to RCVD_BK_NO <3:0> may be unnecessary.

Conversely, the memory banks may only be able to deassert their corresponding memory bank available signals, BK_AVAIL <15:0> 34, two or more address cycles following the cycle in which they are addressed. In such a computer system, comparing CPU_ADDRESS <39:26> to RCVD_ADDRESS <39:6> or CPU_BK_NO <3:0> to RCVD_BK_NO <3:0> will only determine the current memory bank which is being accessed, it will not determine which memory bank was addressed in the previous cycle or cycles. Therefore, in such a computer system, during the address cycle or cycles following the addressing of a memory bank and until the corresponding memory bank available signal is deasserted, tracking logic 42 includes logic to track memory banks which have been accessed but which do not yet have their memory bank available signals deasserted.

Additional tracking logic may also be required where the memory modules have transaction queues and are capable of accepting multiple transactions. Such a memory module will not be unavailable until its transaction queue is filled. Where a memory bank's indication of availability status is not indicated until the end of the next address cycle or until a subsequent address cycle after the transaction queue is filled, the tracking logic is necessarily more complex. In such a situation, the tracking logic needs to keep track of the number of transactions each memory module is capable of accepting and the number of outstanding transactions currently in each memory module's queue.

FIG. 3 shows a more detailed diagram of memory module 18. It is to be understood that memory module 20 as well as other memory modules (not shown) connected to system bus 22 would have similar logic. As shown, memory module 18 includes a memory system bus interface 44 and memory banks 18a and 18b. Memory module 18 further includes decode logic for bank a and bank b, 46, 48, respectively, which are both connected to memory system bus interface logic 44. Memory system bus interface logic 44 receives the system bus ADDRESS <39:6> 26 signals and sends MEM_RCVD_ADDRESS <39:6> to control logic (not shown) for both bank a and bank b. Memory system bus interface logic 44 also receives the system bus bank number signals, BK_NO <3:0> 36, which are driven by tracking logic on commander modules with a value indicating the specific memory bank the commander modules wish to access. Memory system bus interface logic 44 sends corresponding memory bank identification signals, MEM_BK_ID <3:0>, to the decode logic for bank a 46 and bank b 48. This reduces memory latency by allowing a quick compare of MEM_BK_ID <3:0> to a value held in a virtual node identification (VID) register 46a, 48a in decode logic 46, 48, respectively, rather than requiring decode logic 46, 48 to decode the entire system bus address, ADDRESS <39:6>.

Each of the memory banks on the system bus corresponds to one of the system bus bank available signals, BK_AVAIL <15:0>. Where each memory module in a computer system is required to contain the same number of memory banks, the bank available signals may be assigned by virtue of the memory module's position (i.e., backplane slot) on the system bus 22. In a preferred embodiment, where each of the memory modules may contain a variable number of memory banks, each memory module is connected to all sixteen system bus bank available signals, BK_AVAIL <15:0> and within decode logic 46 and 48 is logic (not shown) for determining which bank available signal is associated with the corresponding memory bank.

Decode logic 46 and 48 compares MEM_BK_ID <3:0> to the value stored in the VID registers 46a, 48a to determine if their associated memory bank 18a, 18b is the target of the current system bus transaction. In a preferred embodiment, VID registers 46a and 48a are loaded at power-up by memory configuration software. If one of the memory banks 18a or 18b is the target of the current transaction, the associated decode logic 46 or 48 deasserts a corresponding one of the memory bank available signals, MEMNBK_AVAIL <15:0>, to memory system bus interface 44 and memory system bus interface 44 deasserts a corresponding system bus memory bank available signal, BK_AVAIL <15:0> 34, on system bus 22. Decode logic 46, 48 also asserts a valid bank signal, VLD_BK_ID_A or VLD_BK_ID_B, to control logic (not shown) associated with bank a and bank b which will then cause the memory bank to respond to the current system bus transaction. The deasserted memory bank available signal notifies all commander modules on the system bus that the corresponding memory bank is unavailable.

Decode logic 46, 48 further includes write hold logic (not shown) for holding the corresponding bank available signal deasserted until the data has been written into the RAMs of the corresponding memory bank when the system bus command lines, Command <2:0>, indicate a write transaction. This prevents another CPU or I/O module (i.e., commander module) from attempting to access the memory bank until the write is completed. Similarly, in the preferred embodiment, decode logic 46, 48 deasserts the corresponding memory bank available signal while the corresponding memory bank is undergoing a memory refresh cycle.

As previously mentioned, when the data bus sequence counter 44a matches the tagged sequence number and the target memory module is ready to respond, the target module asserts SEND_DATA and three cycles later the data transfer takes place.

Referring back to FIG. 2, CPU 12 is further shown to include cache tag look up logic 50. Cache tag look up logic 50 receives address signals, CPU_ADDRESS <39:6>, from a processor (not shown) on CPU 12 while the processor is executing instructions and at the same time as the processor asserts its system bus request signal, CPU_REQ, to arbitration logic 40. The address signals reflect the address of locations holding data or instructions needed by the processor.

While arbitration logic 40 determines which commander module will be granted control of the system bus 22, cache tag look up logic 50 uses CPU_ADDRESS <39:6> to determine if the data or instructions required by the processor is located in cache memory (not shown) on CPU 12. If the data is in cache memory, cache tag look up logic 50 asserts a cache hit signal, CACHE_HIT, to arbitration logic 40. Similar to the assertion of MEM_BK_BSY by the memory bank tracking logic 42, the assertion of CACHE_HIT, as will be described in more detail below, causes arbitration logic 40 to withdraw its request for control of the system bus during a non-arbitration cycle when CPU 12 has not won arbitration or, if CPU 12 has won arbitration, forces the issuance of a no-operation command on the system bus command lines, Command <2:0>.

As also shown in FIG. 2, CPU 12 includes command logic 52 which sends command signals, CPU_CMD <2:0>, to bus interface 38 which drives similar values on system bus command signals, COMMAND <2:0>. Command logic 52 also receives command signals (not'shown) from a processor (not shown) on CPU 12 and receives a force no-operation command signal, FORCE_NOP, from arbitration logic 40. If it is determined that CPU 12 does not require control of system bus 22 (i.e., MEM_BK_BSY or CACHE_HIT is asserted), arbitration logic 40 will assert FORCE_NOP to command logic 52. Thus, if arbitration logic 40 determines that CPU 12 has won arbitration and asserts the GRANT signal when CPU 12 does not actually require control of system bus 22 which causes arbitration logic 40 to assert FORCE_NOP, command logic 52 will provide a no-operation command on CPU_CMD <2:0> and bus interface logic 38 will drive a no-operation command on COMMAND <2:0>.

There are many instances when a commander module may arbitrate for the system bus prior to determining whether such control is required. In the above discussion with reference to FIG. 2, for simplicity, only two situations in which a commander module may wish to begin arbitration early were discussed; arbitration prior to determining whether the target memory bank is available and arbitration prior to determining whether the required data is in local cache memory. Another situation in which a commander module may begin to arbitrate for the system bus prior to determining whether control of the system bus is required includes the situation where a control and status register (CSR) may not be accessed when unavailable and the commander module arbitrates for control of the system bus prior to determining whether the CSR it wishes to access is available. Another situation includes arbitration prior to determining whether the I/O module 16 (FIG. 1) is available to respond to a transaction.

Figure 4:
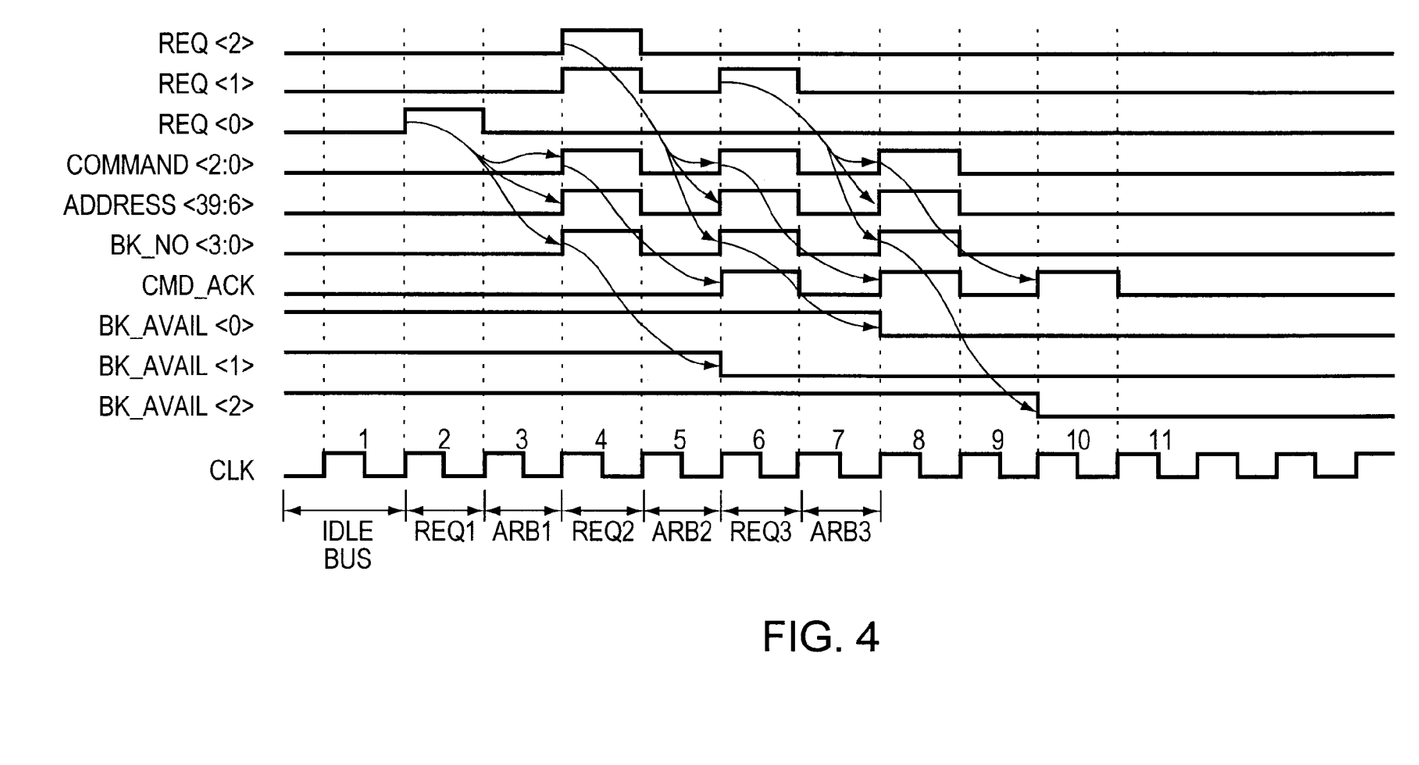
FIG. 4 is a detailed time line diagram including a portion of the address bus signals.

Referring now to FIG. 4, a detailed time line diagram shows several address bus cycles in which valid commands are issued followed by corresponding command acknowledge signals from the addressed target modules. A portion of the address bus signals are shown including the system bus control request signals, REQ <0>, REQ <1>, REQ <2>, command signals, COMMAND <2:0>, address signals, ADDRESS <39:6>, bank number signals, BK_NO <3:0>, command acknowledge signal, CMD_ACK, three of the sixteen bank available signals, BK_AVAIL <0>, BK_AVAIL <1>, BK_AVAIL <2>, and a clock signal, CLK.

As shown in FIG. 4, in cycle 1 and previous to cycle 1, the address bus is idle (i.e., no request signals are asserted). In cycle 2, REQ <0> is asserted generating a first request cycle REQ1. Because none of the other request signals shown, REQ <2> or REQ <1>, are asserted in cycle 2, during cycle 3, which is the first arbitration cycle, ARB1, the commander module associated with REQ <0>, for example, CPU 12 (FIGS. 1 and 2), will win arbitration. Thus, in cycle 4, CPU 12 drives a command on COMMAND <2:0>, an address of a target module on ADDRESS <39:6>, and a unique bank number corresponding to a memory bank to be accessed on BK_NO <3:0>. In cycle 6, the target module, for example, memory module 18, asserts the command acknowledge signal, CMD_ACK, and deasserts the bank available signal, for example, BK_AVAIL <1>, associated with the memory bank, for example, memory bank 18a, which corresponds to the value driven on BK_NO <3:0>. The deassertion of BK_AVAIL <1> indicates to all commander modules that memory bank 18a is now unavailable.

Also shown in cycle 4 is the assertion of REQ <2> and REQ <1> making cycle 4 a second request cycle REQ2. In a preferred embodiment, there is a null cycle between subsequent request cycles (i.e., no commanders may assert their associated request signal in cycle 3 of FIG. 4). Additionally, in a preferred embodiment, a commander module which issues a no-operation command or removes its arbitration request does not have its priority level reduced (i.e., a commander module is not penalized for false arbitration). Thus, in order to prevent the same commander module from continuously gaining control of the system bus and issuing no-operation commands and to permit other commander modules to gain control of the system bus, a commander module which wins an arbitration cycle is not permitted to reassert its system bus control request signal for a minimum of two system bus cycles following the assertion of its request signal. Therefore, if CPU 12, corresponding to REQ <0>, wishes to gain control of system bus 22 again, it is not permitted to reassert REQ <0> until cycle 5 (i.e., two cycles following the assertion of REQ <0>). However, because REQ <1> and REQ <2> are asserted in cycle 4, the earliest that CPU 12 can reassert REQ <0> is cycle 6.

In cycle 5, the second arbitration cycle ARB2, the commander module associated with REQ <2>, for example, CPU 14 (FIGS. 1 and 2), wins arbitration because in this instance it has a higher priority level than the commander module associated with REQ <1>, for example, I/O module 16. Thus, in cycle 6, CPU 14 drives a command on COMMAND <2:0>, the address of the target module on ADDRESS <39:6> and the unique bank number of the targeted memory bank on BK_NO <3:0>. In cycle 8, the target module, for example, memory module 20, asserts the command acknowledge signal, CMD_ACK, and deasserts the bank available signal, for example, BK_AVAIL <0>, associated with the memory bank, for example, memory bank 20a, which corresponds to the value driven on BK_NO <3:0>. The deassertion of BK_AVAIL <0> indicates to all commander modules that memory bank 20a is now unavailable.

In cycle 6, REQ <1> is shown reasserted making cycle 6 a third request cycle, REQ3. The commander module associated with REQ <1> is permitted to reassert REQ <1> after one null cycle, because it did not win the previous arbitration cycle. Because no other commander modules are shown to have their request signals asserted in cycle 6, during cycle 7, the third arbitration cycle ARB3, the commander module associated with REQ <1>, I/O module 16, will win the arbitration such that in cycle 8 I/O module 16 will drive the command lines, address lines and bank number lines with values corresponding to the transaction to be issued. The addressed target module will assert command acknowledge and will also deassert the appropriate bank available line, for example, BK_AVAIL <2>, in cycle 10. The deassertion of BK_AVAIL <2> indicates to all commander modules that the associated memory bank, for example, memory bank 20b, is unavailable.

Figure 5:
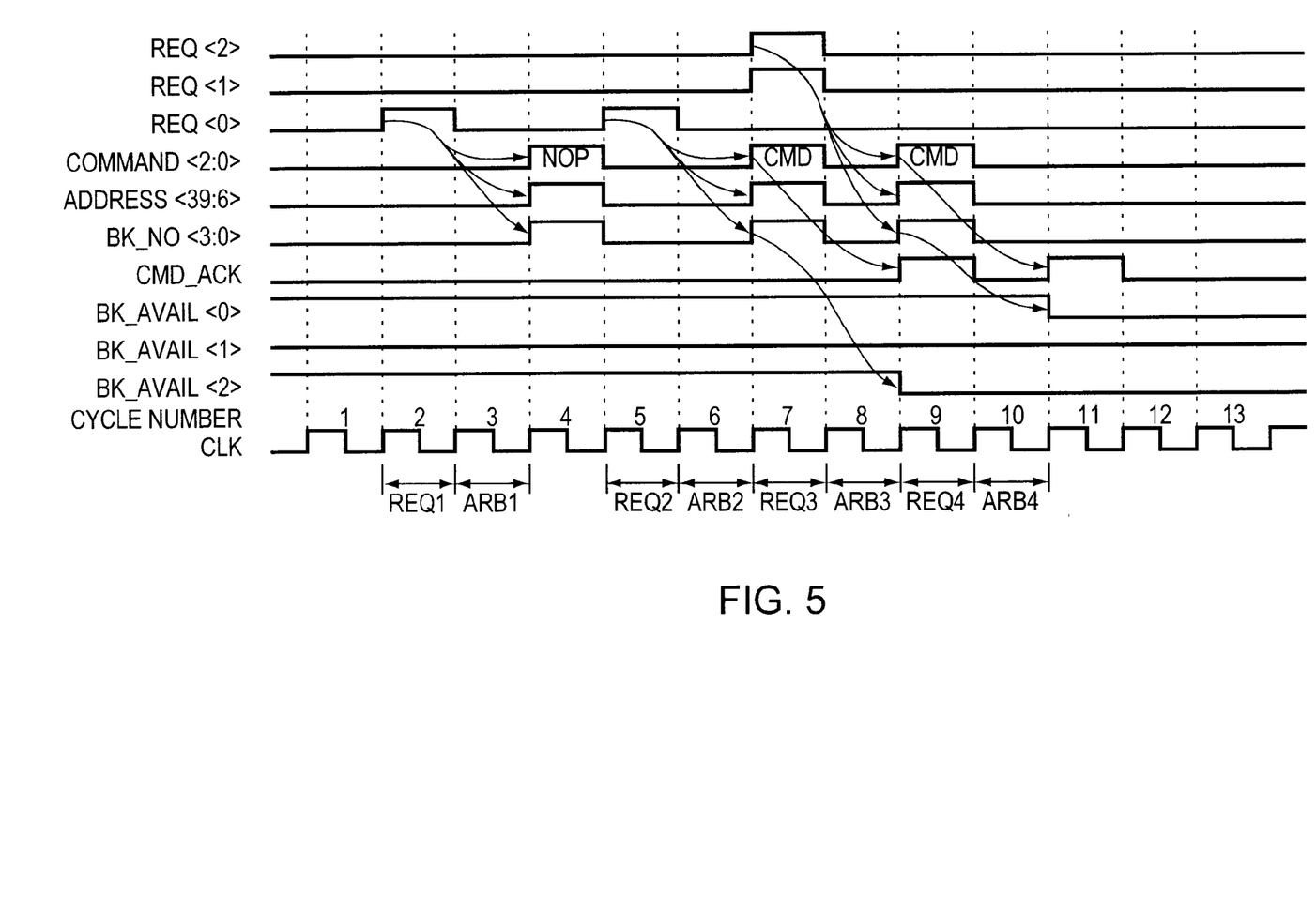
FIG. 5 is a detailed time line diagram including a portion of the address bus signals similar to FIG. 4.

Referring now to FIG. 5, a time line diagram, similar to the time line diagram of FIG. 4, shows several address bus cycles in which a no-operation (NOP) command and valid commands are issued. In cycle 2, CPU 12 asserts REQ <0>, and because no other system bus control request signals are shown asserted in cycle 2, CPU 12 will win arbitration cycle ARB1 in cycle 3. In this instance, CPU 12 requested control of the system bus prior to determining whether it required such control, i.e., early arbitration. Because CPU 12 has been granted control of the system bus, it drives a command on COMMAND <2:0> in cycle 4. As shown, CPU 12 drives a NOP on COMMAND <2:0> in cycle 4 indicating a determination that control of the system bus is not required. CPU 12 also drives the address signals, ADDRESS <39:6>, and the bank number signals, BK_NO <3:0>, however, the values may be arbitrary. As shown, no target module asserts a command acknowledge and no bank available line will be deasserted in response to the NOP command.

As previously mentioned, when a commander module wins an arbitration cycle, it waits two cycles prior to requesting control of the system bus again. Thus, as shown in FIG. 5, in cycle 5, not cycle 4, the CPU 12 reasserts REQ <0>. Again, no other system bus control request signals are shown asserted, and, thus, in cycle 6, the second arbitration cycle, ARB2, CPU 12 is granted control of the system bus. This time, in cycle 7, CPU 12 drives a valid command on the command lines, a valid address on the address lines and a valid bank number on the bank number lines which causes the addressed target module to assert the command acknowledge signal, CMD_ACK, and deassert the appropriate bank available line, for example, BK_AVAIL <2>, in cycle 9.

In cycle 7, CPU 14 and I/O module 16 (FIGS. 1 and 2) are shown to seek control of the system bus by asserting REQ <2> and REQ <1>, respectively. Again in this diagram, REQ <2> has a higher priority than REQ <1>, therefore, CPU 14 wins the third arbitration cycle ARB3 in cycle 8. In cycle 9, CPU 14 is shown to drive a valid command on COMMAND <2:0>, a valid address on ADDRESS <39:6> and a valid bank number on BK_NO <3:0>. In response, the addressed target module, in this case, memory module 20, asserts CMD_ACK and memory bank 20a provides for the deassertion of BK_AVAIL <0> in cycle 11.

In cycle 9 (i.e., one system bus cycle after the assertion of REQ <1>), I/O module 16 may reassert REQ <1> in order to gain control of the system bus. In this case, however, REQ <1> is shown deasserted in cycle 9 which indicates that I/O module 16 was involved with an early arbitration for the system bus in cycle 7 and subsequently determined that it did not require control of the system bus (i.e., false arbitration). Because CPU 14 won control of the bus in cycle 8, arbitration logic on I/O module 16 (not shown) which is similar to arbitration logic 40 on CPU 12 (FIG. 2) need only deassert the ARB_REQ signal to the system bus interface 16a (FIG. 1) on I/O module 16.

As mentioned above, two cycles after a valid address/command is issued, the target module will assert the command acknowledge signal, CMD_ACK, and data transactions on the data bus will follow in the same order as the address/command transactions on the address bus. Thus, the minimum amount of time a target can indicate that it is ready to participate in the data transaction is two cycles after the corresponding address/command cycle (i.e., assert SEND_DATA simultaneously with the assertion of CMD_ACK). The address bus and the data bus are independent, however, in that the target module may stall the data bus and respond later than the minimum amount of two cycles following the corresponding address/command cycle (i.e., assert SEND_DATA more than two cycles later).

In a preferred embodiment of the present invention, the address bus and the data bus operate off of the same or similar clock signal and have cycles of equal time periods. As mentioned previously, data transactions require two data bus cycles (i.e., two transfers of 256 bits of data) and address/command transactions require one address bus cycle. In the preferred embodiment, a null cycle (i.e., no module is driving the bus) is required between each data bus transaction and between each address bus transaction. Thus, when the address bus and the data bus are operating at their maximum transfer rate, an address and command can be transferred on the pipelined address bus once every two address bus cycles and a data transaction can begin once every three data bus cycles. Hence, when both the address bus and the data bus are operating at their maximum transfer rates, the address bus has a higher bandwidth than the data bus. This difference in bandwidth creates a probability that a dropped (i.e., a no-operation command issued) address bus cycle will not affect the maximum data transfer rate of the data bus.

Figure 6:
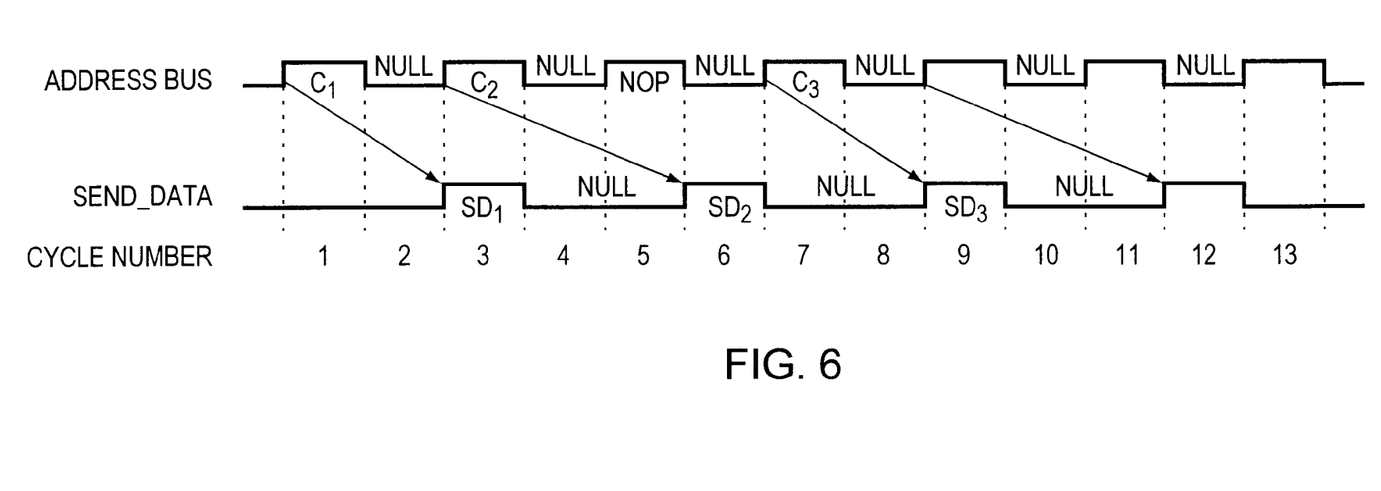
FIG. 6 is a time line diagram of the address bus and data bus of FIG. 2.

Referring now to FIG. 6, a sequence of address/command transactions followed by corresponding assertions of SEND_DATA at a maximum data transfer rate are shown. As shown, a command C1 is transferred in cycle 1 on the address bus (top line), followed by a null cycle on the address bus. Then in cycle 3, the target responds with SEND_DATA SD1 (bottom line) in cycle 3 corresponding to command C1. Similarly, a second command C2 is transferred in cycle 3 on the address bus, followed by a null cycle, and corresponding SEND_DATA SD2 is transferred in cycle 6 on the data bus following two null cycles in cycles 4 and 5 (i.e., SEND_DATA can only be asserted once every three cycles because a data transfer requires two data cycles). A no-operation (i.e., NOP) command is then shown transferred in cycle 5 on the address bus with no corresponding SEND_DATA on the data bus. One null cycle later, in cycle 7, a third command C3 is transferred on the address bus which corresponds to SEND_DATA SD3 in cycle 9 on the data bus. Thus, as can be seen in FIG. 6, the maximum data transfer on the data bus has not been reduced by the NOP command in cycle 5 on the address bus; SD1 in cycle 3 is followed by two null cycles in cycles 4 and 5, followed by SD2 in cycle 6 and two null cycles in cycles 7 and 8, and then SD3 in cycle 9.

By allowing commander modules to arbitrate for control of the system bus while simultaneously determining whether such control is required, the time required to complete a system bus transaction is reduced, i.e., the time required to arbitrate for control of the system bus is not added to the total transaction time. Further, where the address bus has a higher bandwidth than the data bus, a probability exists that the issuance of no-operation commands on the address bus will not reduce the maximum data transfer rate of the data bus.

Having described preferred embodiments of the invention, it will now become apparent to one of skill in the art that other embodiments incorporating their concepts may be used. Accordingly, it is submitted that the invention should not be limited to the disclosed embodiments, but rather should be limited by the spirit and scope of the appended claims.

What is claimed is:

1. A commander module, coupled to a system bus including system bus control request signals wherein said commander module is associated with one of said system bus control request signals, comprising:
    means for determining whether control of said system bus is required;
    means for requesting control of said system bus, prior to said determining means determining whether such control is required, by asserting said associated system bus control request signal; and
    means, responsive to said system bus control request signals or arbitrating for control of said system bus and for granting control of said system bus to said commander module;
    wherein
    said system bus further includes lines for said commander module to transmit command signals, and
    said requesting means further includes means for forcing a no-operation command on said system bus command lines if said commander module is granted control of said system bus by said requesting means and said commander module determines that control of said system bus is not required.

2. The commander module according to claim 1, wherein said arbitrating means is a distributed arbitration mechanism.

3. The commander module according to claim 1, wherein said requesting means further includes means for withdrawing said commander module's request for control of said system bus when said commander module determines, during a non-arbitration cycle, that control of said system bus is not required.

4. A computer system comprising:
    a system bus having system bus control request signals;
    at least two commander modules coupled to said system bus, wherein each of said commander modules is associated with one of said system bus control request signals and includes:
        means for determining whether control of said system bus is required; and means for requesting control of said system bus, prior to said determining means determining whether such control is required, by asserting said associated system bus control request signal; and means, responsive to said system bus control request signals, for arbitrating for control of said system bus and for granting control of said system bus to one of said commander modules, wherein said arbitration means further includes means for withdrawing said commander module's request for control of said system bus when said commander module determines, during a non-arbitration cycle, that control of said system bus is not required, said system bus includes lines for said commander modules to transmit command signals, and said arbitration means further includes means for forcing a no-operation command on said system bus command lines if said commander module is granted control of said system bus by said arbitration means and said commander module determines that control of said system bus is not required.

5. The computer system according to claim 4, wherein said arbitrating means is a distributed arbitration mechanism.

6. The computer system according to claim 4, wherein said arbitrating means is a central arbitration mechanism.

7. The computer system according to claim 4, wherein said system bus includes a pipelined address bus having a first bandwidth and a pipelined data bus having a second bandwidth.

8. The computer system according to claim 4, wherein said system bus includes a combination address and data bus.

9. A computer system comprising:

a system bus having system bus control request signals, command lines, an address bus and a data bus with the address bus having a higher bandwidth than the data bus;

at least two commander modules each coupled to the command lines, the address bus and the data bus of said system bus and with each of said commander modules being associated with one of said system bus control request signals, and wherein each one of said commander modules include:

means for determining whether control of the system bus is required;

means for requesting control of said system bus prior to said determining means determining whether control of the system bus is required by asserting said associated system bus control request signal;

means responsive to said system bus control request signals for arbitrating for control of said system bus and for granting control of said system bus to the said one of said commander modules; and means for forcing a no-op command on said system bus command lines if said one of said commander modules is granted control of said system bus by said arbitration means and said one of said commander modules determining means determines that control of said system bus is not required.

10. The computer system of claim 9 wherein the system bus bandwidth of said system bus is substantially nonaffected by said means for forcing a no-op on said system bus.

11. The computer system of claim 9 wherein said system bus includes a pipelined address bus a having first bandwidth and a pipelined data bus having a second bandwidth.

12. The computer system of claim 9 wherein said system bus includes a combination address and data bus.

13. The computer system of claim 9 wherein each commander module is coupled to all control request signals of the system bus.

* * * * *